Figure 6:
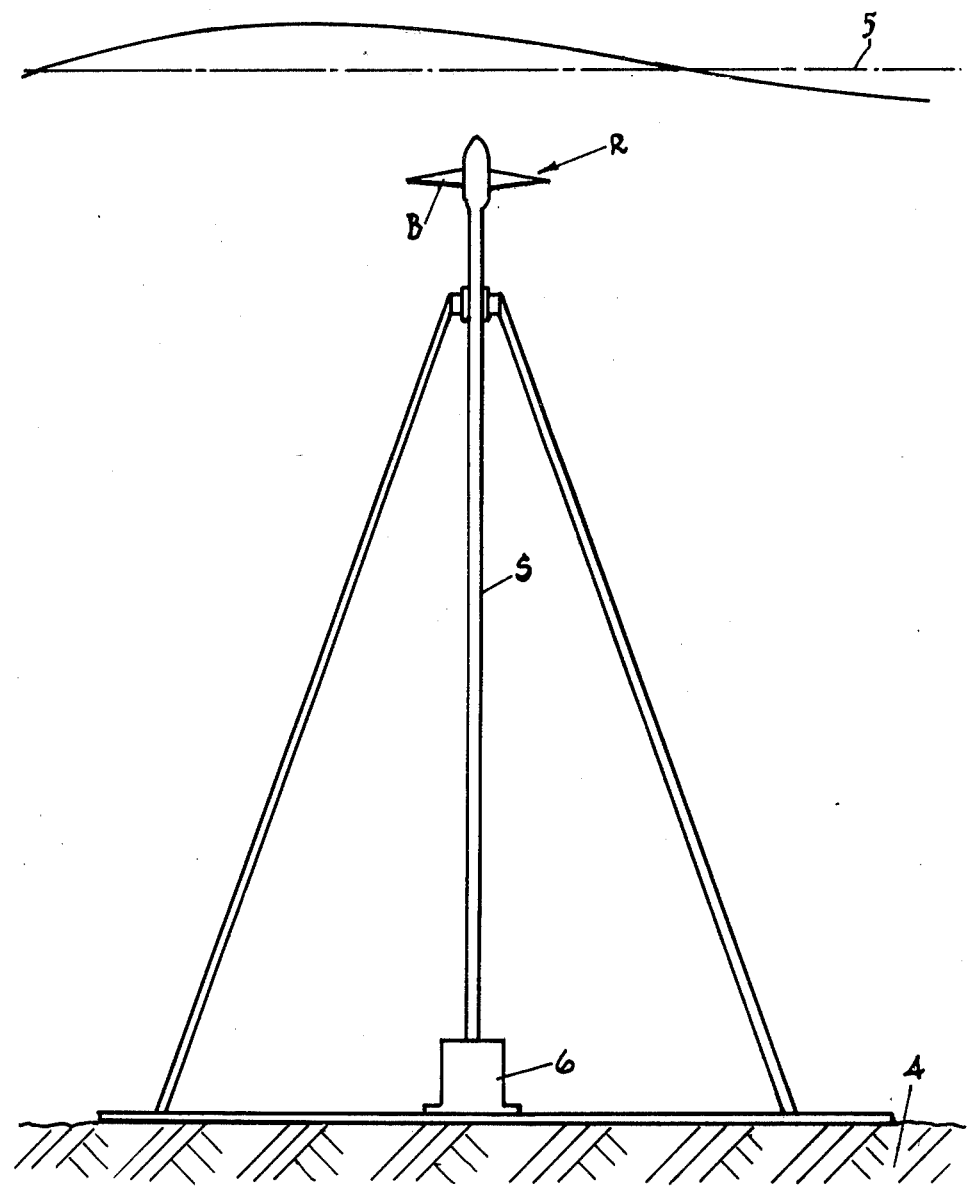

United States Patent [19]
Lee

[11] 4,313,711
[45] Feb. 2, 1982

[54] TURBINE AND LIKE ROTARY MACHINES

[75] Inventor: Alan S. Lee, Leicester, England

[73] Assignee: The English Electric Company Limited, London, England

[21] Appl. No.: 935,789

[22] Filed: Aug. 22, 1978

[30] Foreign Application Priority Data

Aug. 24, 1977 [GB] United Kingdom ............... 35468/77

[51] Int. Cl.³ .......................... F03B 13/12; F03B 3/04; F03B 3/12
[52] U.S. Cl. .................................... 415/7; 416/223 A
[58] Field of Search ............................... 415/7, 55, 58; 416/223 R, 223 A

[56] References Cited

U.S. PATENT DOCUMENTS

| 1,835,018 | 12/1931 | Darrieus | 416/111 X |
| 3,064,137 | 11/1962 | Corbett et al. | 415/7 X |
| 3,912,938 | 10/1975 | Filipenco | 415/7 X |
| 4,078,382 | 3/1978 | Ricafranca et al. | 415/7 X |
| 4,221,538 | 9/1980 | Wells | 415/7 X |

FOREIGN PATENT DOCUMENTS

| 44-28402 | 12/1969 | Japan | 416/140 R |
| 44-29683 | 12/1969 | Japan | 415/7 |
| 250664 | 7/1948 | Switzerland | 415/7 |
| 745084 | 2/1956 | United Kingdom | 416/140 R |
| 1447758 | 9/1976 | United Kingdom | 416/140 R |

Primary Examiner—Everette A. Powell, Jr.
Attorney, Agent, or Firm—Kirschstein, Kirschstein, Ottinger & Cobrin

[57] ABSTRACT

A turbine or like rotary machine of the kind in which a fluid, either a liquid or gas, is arranged to act on a plurality of generally radially extending rotor blades, has each rotor blade fixed in position relative to the rotor hub and is substantially symmetrical about a plane perpendicular to the rotor axis, the blades having surfaces which are of generally aerofoil shape and being mounted with their leading edges facing in the same circumferential direction. The rotor of such a turbine can be driven by a generally axial flow of fluid, the direction of rotation being unchanged when the direction of flow of the fluid is reversed, so that it can be used to advantage in an oscillating or periodically reversing fluid flow. Such a flow may be provided or produced for example, by naturally occurring movement of air or water.

15 Claims, 17 Drawing Figures

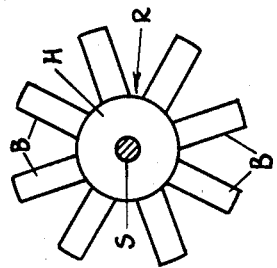
FIG.1.
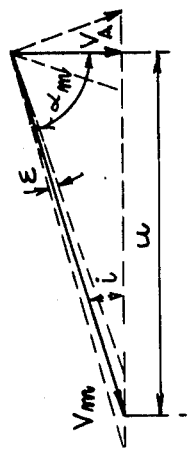
FIG.5.
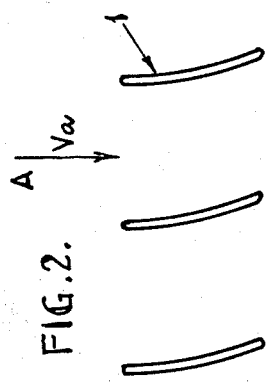
FIG.3.
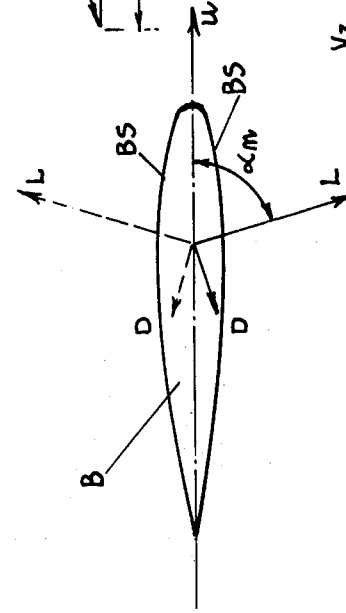
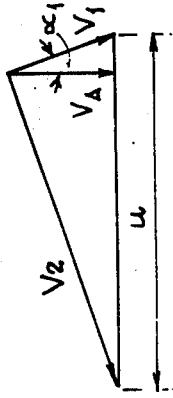
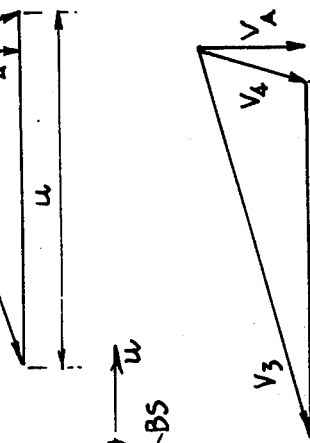
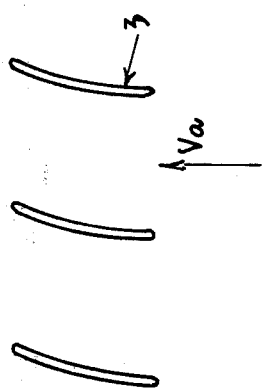
FIG.4.
FIG.2.

TURBINE AND LIKE ROTARY MACHINES

This invention relates to turbines and like rotary machines, hereinafter referred to collectively as turbines for simplicity, which are of the kind in which a working fluid, either in liquid or gaseous form, is arranged to act on a plurality of generally radially extending rotor blades for producing a rotation of the rotor, and is especially, though not exclusively, concerned with such turbines in which the rotor is arranged to be driven by naturally occurring movement of air or water.

Such movement may take the form of an oscillating or periodically reversing flow. Conventional turbines with fixed blades set at an angle to the flow of working fluid suffer from the disadvantage that the direction of rotation of the rotors is reversed when the flow direction reverses, and whilst some turbines of this kind may be designed to operate when driven in either direction, this is only satisfactory as long as the changes in direction are infrequent and the turbines are allowed to operate at or near rated speed for an appreciable time interval, as rapid flow reversals, which prevent the turbines from reaching their rated speed because of their inherent inertia, must clearly result in inefficient operation.

Although unidirectional rotation could be achieved by employing reversible pitch rotor blades, to enable the blade angles to be adjusted in dependence upon the direction of flow of the working fluid such arrangements have not proved satisfactory in practice in view of the degree of mechanical complication required to achieve this.

An object of the invention is to provide an alternative and simpler form of turbine which is capable of being driven unidirectionally by oscillating or periodically reversing fluid flows, but which dispenses with the need for reversible pitch rotor blades.

According to the invention in a turbine of the kind referred to each rotor blade is fixed in position relative to the rotor and is substantially symmetrical about a plane perpendicular to the rotor axis, the blades having surfaces which are of generally aerofoil shape and being mounted with their leading edges facing in the same circumferential direction.

It has been found that the rotor of such a turbine can be driven by a generally axial flow of working fluid, and the direction of rotation is unchanged when the direction of flow of the working fluid is reversed.

The turbine may be used to drive an electric generator, pump or other rotary device, or may be associated with a revolution counter for recording or monitoring a fluid flow.

A turbine in accordance with the invention can be mounted for rotation below the surface of a liquid subject to cyclic movement, with the axis of rotation of the turbine so disposed that the cyclic flow of liquid past the turbine blades produces a unidirectional rotation of the rotor. For example the turbine can be mounted with its axis of rotation substantially vertical just below the surface of the sea or other expanse of water such that wave motion produces a cyclic flow of water past the rotor blades.

Where the water is relatively shallow the turbine may be mounted on a support structure fixed to the bed of the expanse of water with the turbine rotor at such a depth beneath the surface that wave motion of the water produces said cyclic flow of water past the rotor blades. In other cases the turbine may be supported beneath a floatable body at a distance such that when the body is floating on said expanse of water vertical oscillations of the body resulting from wave motion will produce said cyclic flow of water past the rotor blades.

It will however be appreciated that the turbine may alternatively be supported for rotation about a horizontal or other non-vertical axis, depending upon the direction of water movement.

In some applications the turbine rotor may be mounted in a duct, and in such cases it may be found necessary to provide stator blades axially spaced from the rotor in both directions, the stator blades being inclined in such a manner as to decrease significantly the swirl in the flow of working fluid leaving the rotor; the stator blades are preferably arranged so as virtually to eliminate the swirl so that the flow in the duct after passing the blades is a substantially axial flow. Without these stator blades the fluid masses which are continuously passing the rotor may tend eventually to acquire an angular momentum which could reduce the rotor torque to zero. Where the turbine rotor is accommodated within a duct, the duct may be arranged to be supported with its axis substantially vertical and its lower end below the surface of the expanse of water, the rotor also being located so as to lie below the surface of the water, so that variations in the level of water in the duct caused by wave motion produce a cyclic flow of water past the rotor blades. Alternatively the rotor may be located in an elastic fluid medium, such as air, above the surface of the water in the duct, the variations in the level of water producing a cyclic flow of said elastic fluid past the rotor blades, thereby causing the rotor to rotate. In applications where the turbine is not located within a duct, but operates in a large mass of fluid, such as the open sea, the turbine will operate satisfactorily without stator blades as the rotor outflows will continually mix with the large fluid mass.

In some cases the turbine may be associated with an amplifier for converting the energy in a relatively large slowly moving mass of fluid to a smaller, more rapidly moving mass, the turbine rotor then being located so as to be acted upon by the more rapid fluid flow.

In one such arrangement a column of water in a duct can be made to oscillate by exposing one end of the duct to wave pressure variations and the other end to an elastic fluid medium, within a chamber such as an air tank, the system being tuned approximately to the wave frequency such that resonant oscillations of fluid in the duct occur with an average kinetic energy per unit mass of fluid which is greater than the natural flow, the turbine rotor then being located within the duct in a position where it is subject to the oscillating flow of relatively high kinetic energy.

In another arrangement variations of water level in a chamber of relatively large cross section may be arranged to produce flows of air in one or the other direction in a duct of relatively small cross section communicating with the chamber, the turbine rotor being located within the duct so as to be driven unidirectionally by the flow of air in either direction through the duct. The chamber in such a case may be formed in a body which is arranged to float on the water. In a further arrangement a chamber open at the top may be disposed below the surface of an expanse of water subject to wave motion with a duct having a cross section significantly smaller than the chamber arranged to be disposed with its axis substantially vertical, its lower end located within the chamber and its upper end above the surface of the water, the turbine rotor being located within the duct so as to lie either beneath or above the surface of the water so as to be driven by a cyclic flow through the duct of water or air respectively.

The invention will now be further explained by way of example, with reference to FIGS. 1 to 16 of the accompanying schematic drawings in which:

FIG. 1 illustrates diagrammatically an end view of a typical rotor of a turbine in accordance with the invention, FIG. 2 represents a developed section of a rotor blade and associated stator blades of the turbine, FIG. 3 is a diagram of the velocity vectors of the working fluid flowing in the space between the inlet stator blades and rotor blades of the turbine, FIG. 4 is a vector diagram of the fluid flow in the space between the rotor blades and the outlet stator blades, FIG. 5 is a vector diagram obtained by superimposing the diagrams of FIGS. 3 and 4, and FIGS. 6 to 17 illustrate various applications of a turbine in accordance with the invention.

The turbine rotor R illustrated in FIG. 1 has a hub H mounted on a shaft S and carrying a plurality of fixed radially extending blades B, each blade being symmetrical with respect to a plane perpendicular to the rotor axis, and having blade surfaces BS of generally aerofoil shape as shown more clearly in FIG. 2. Because of the shape and symmetrical nature of the blades working fluid flowing in both axial directions will produce the same unidirectional rotation of the rotor.

The rotor may be located between two rows of stator blades and the operation of the turbine incorporating such stator blades will now be explained by reference to FIGS. 2 to 5.

In use of the turbine, fluid, for example water, flowing through the turbine in the direction of the arrow A with a velocity $V_A$ (FIG. 2) passes first through the stator blade row 1 from which it emerges at the angle $\alpha$, to the axis of rotation as represented by the vector $V_1$ (FIG. 3). Relative to the rotor blade B this velocity appears as the vector $V_2$, obtained by subtracting vectorially the blade speed U from the vector $V_1$. In passing over the rotor blades the flow is deflected through a small angle E so that the flow emerging relative to the rotor is represented by the vector $V_3$ of FIG. 4. Addition of the blade velocity U then gives the absolute value of the rotor exit velocity $V_4$. The flow then passes through the second row of stator blades 3 from which it emerges parallel to the axis of rotation. In deriving the vector diagrams it is assumed that the cross sectional area of the turbine annulus perpendicular to the rotor axis is constant so that the meridional velocity vector $V_A$ is unchanged as the water flows through the blade rows. The velocity vectors $V_2$ and $V_4$ are actually fictitious velocities corresponding to the velocities which would exist at an infinite distance from the blade if the axial separation of the blades was also infinity, the actual velocities between the blade rows being subjected to interference flows arising from the action of the blades themselves. Nevertheless it can be shown that if the diagrams are drawn with these fictitious velocities, the lift force L applied to the section of rotor blades is perpendicular to the vector $V_m$ in FIG. 5, the mean of the vectors $V_2$ and $V_3$, and that the magnitude of the force per unit area is equal to that on an isolated aerofoil in a flow having the angle of incidence i in FIG. 4. Consequently, the force L has a component $L \cos \alpha_m$ in the same direction as the rotor blade velocity U so that work is done on the blade. Clearly, if the direction of the fluid flow were to reverse so that the fluid entered through the stator row 3 and left by the stator row 2, the force $L \cos \alpha_m$ would still have the same direction and the direction of rotation of the shaft would be unchanged. In a periodic flow the rotor will therefore rotate continuously in one direction provided the turbine shaft is linked with a mass of sufficient inertia to continue rotation during that part of the cycle in which the flow velocities are very small.

In addition to the lift force L, a drag force D due to flow losses acts on the rotor blade section along the direction of $V_m$. The work done in unit time on the blade is therefore U ($L \cos \alpha_m - D \sin \alpha_m$) while the negative work done on the fluid is $V_A$ ($L \sin \alpha_m + D \cos \alpha_m$), giving the blade section efficiency:

$$E = \frac{U(L \cos \alpha_m - D \sin \alpha_m)}{V_A(L \sin \alpha_m + D \cos \alpha_m)} \quad (1)$$

From the geometry of FIG. 5 this may be written:

$$E = \frac{\frac{L}{D} - \frac{U}{V_A}}{\frac{L}{D} + \frac{V_A}{U}} \quad (2)$$

The characteristics of symmetrical aerofoils with rough leading edges and Reynolds numbers of $3 \times 10^6$ appropriate to operate in water show that the greatest value of L/D may be 50 when $U/V_A = 9.5$ giving D=0.81 from formula (2) and showing that an efficient rotor may be constructed on this principle. Although in a practical turbine operating in oscillating flow, all sections of the blades will not operate at the theoretical maximum efficiency owing to the variation of the blade velocity U along the lengths of the blades, and the velocity vector $V_A$ with time, the variation in U may be minimised by mounting the rotor blades on a hub so that the flow passes through a relatively narrow annulus, and the variation in $V_A$ may be accommodated by designing the mean blade section to operate efficiently at the root means squared velocity of the flow cycle, so that the variation from optimum conditions will be small during that part of the cycle in which the flow carries the greater part of the cyclic energy.

A typical design of turbine rotor with a hub/tip ratio of 0.5 can be shown to give an integrated theoretical efficiency of $72\frac{1}{2}\%$, demonstrating acceptable overall efficiencies of such a rotor.

The presence of the stator blades 3 assists in reducing the swirl of the fluid leaving the rotor so that on reversal of the flow a steady flow condition is rapidly obtained. The use of stator blades is particularly advantageous when the rotor is accommodated within a duct, and helps to increase the efficiencies obtainable. However the presence of the stator blades is not essential to the satisfactory operation of the turbine as in cases where the working fluid is not confined, most of the swirl in the fluid leaving the rotor will be destroyed by mixing with the surrounding fluid.

FIG. 6 illustrates one application of a turbine in accordance with the invention in which the stator blades are omitted. The turbine is mounted in shallow water on the sea bed 4, with the rotor R supported on top of a vertical shaft S at a position just below the normal wave troughs, the lower end of the shaft S connected to a submerged generator 6. Wave movement about the mean wave level 5 produces cyclic variations in the depth of the water which results in an oscillating movement of the water through the rotor blades B, this producing a unidirectional rotation of the rotor as previously explained.

Figure 7:
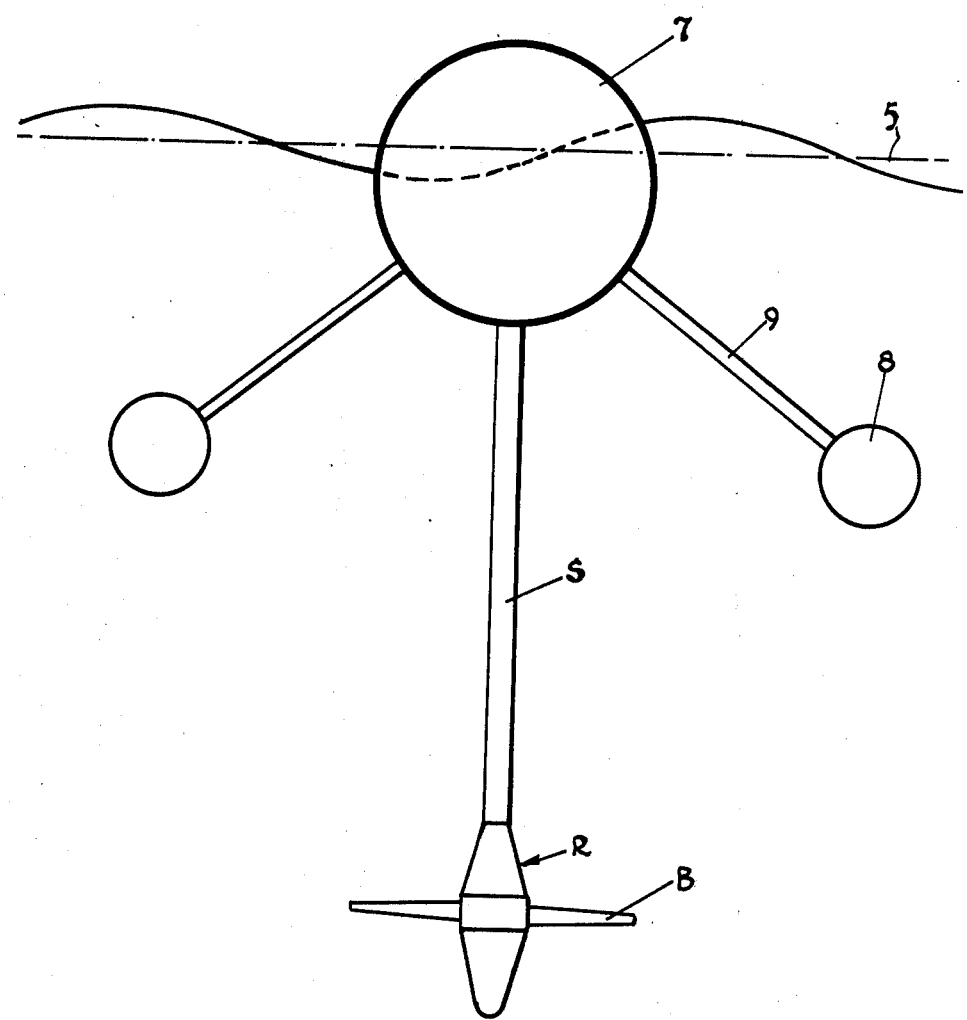

FIG. 7 shows another application of the invention, in which the turbine rotor R is supported at the lower end of a substantially vertical shaft S projecting downwards from a floating body 7 such as a buoy, containing a generator 6 (not shown) suitably coupled to the shaft. Vertical oscillations of the body 7 on the waves will produce a cyclic flow of water past the rotor blades B causing rotation of the rotor shaft S. By this means electrical energy may be supplied to devices such as lamps carried by the body. Rotation of the body under the reaction torque of the turbine can be prevented by the provision of suitably disposed vanes as at 8 fixed to the body by outwardly inclined arms 9.

Figure 8:
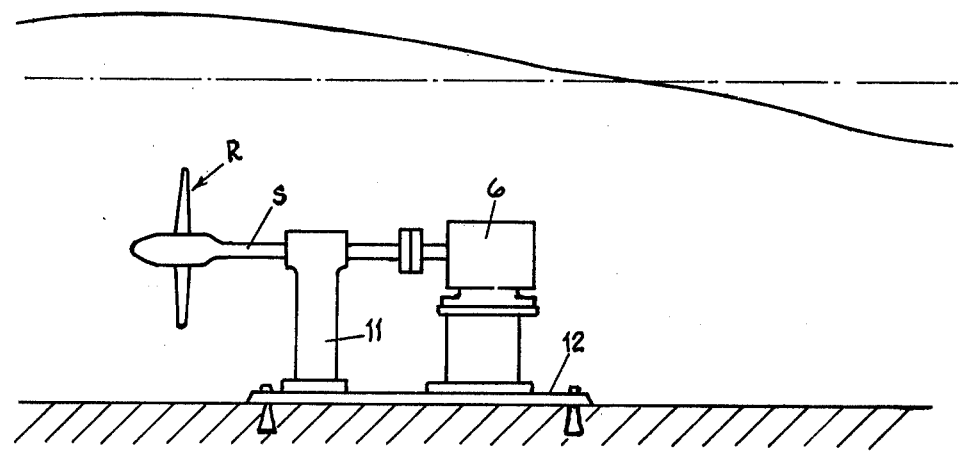

In shallow water the waves tend to oscillate with almost constant amplitude, regardless of depth and the rotor of a turbine in accordance with the invention can in some cases be arranged to rotate about a horizontal axis as shown in FIG. 8, the rotor R in this case being fixed to one end of a horizontal shaft S carried in bearings in a pedestal 11 which is mounted on a base 12 secured to the sea bed 4, and coupled to a generator 6.

Figure 9:
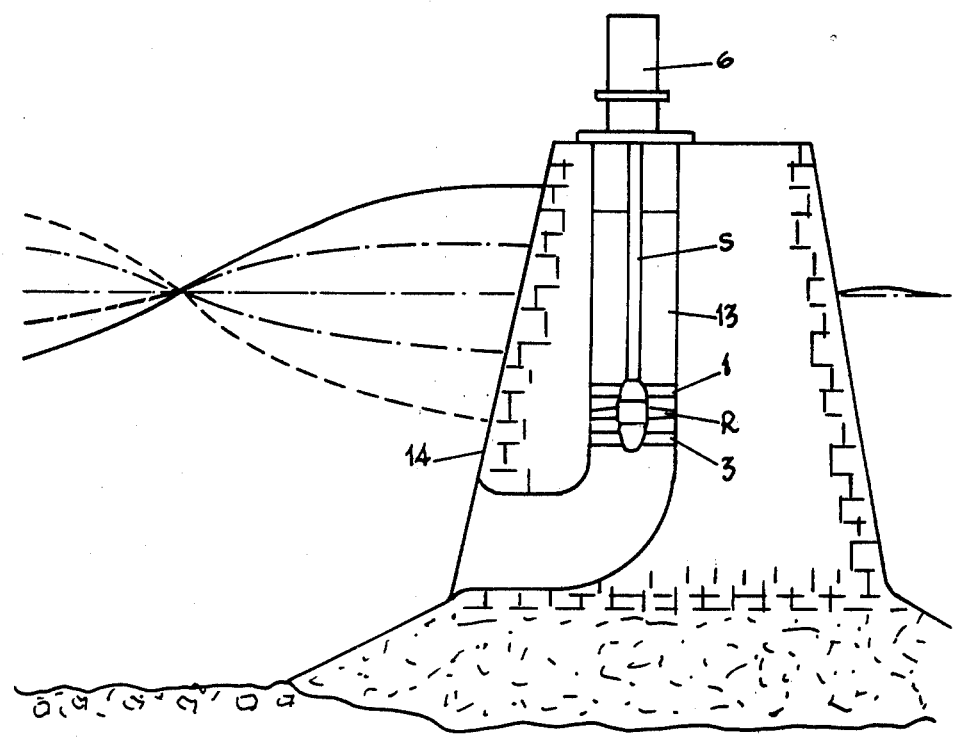

FIG. 9 shows a turbine in accordance with the invention accommodated within a vertically extending portion of a duct 13 in a sea wall 14, with the turbine rotor R fixed to the lower end of a shaft having its upper end connected to a generator 6. The lower end of the duct 13 communicates with the open sea at a level below the wave troughs and the rotor R is located between two rows of stator blades 1,3 at a position also below the level of the wave troughs so that the wave motion produces a cyclic variation in the level of the water in the duct, which drives the turbine. As a sea wall presents a reflecting surface to a wave train the waves at the sea wall are standing waves of twice the normal amplitude so that this will result in a greater movement of water within the duct, thereby enhancing the amount of energy extracted by the turbine.

Figure 10:
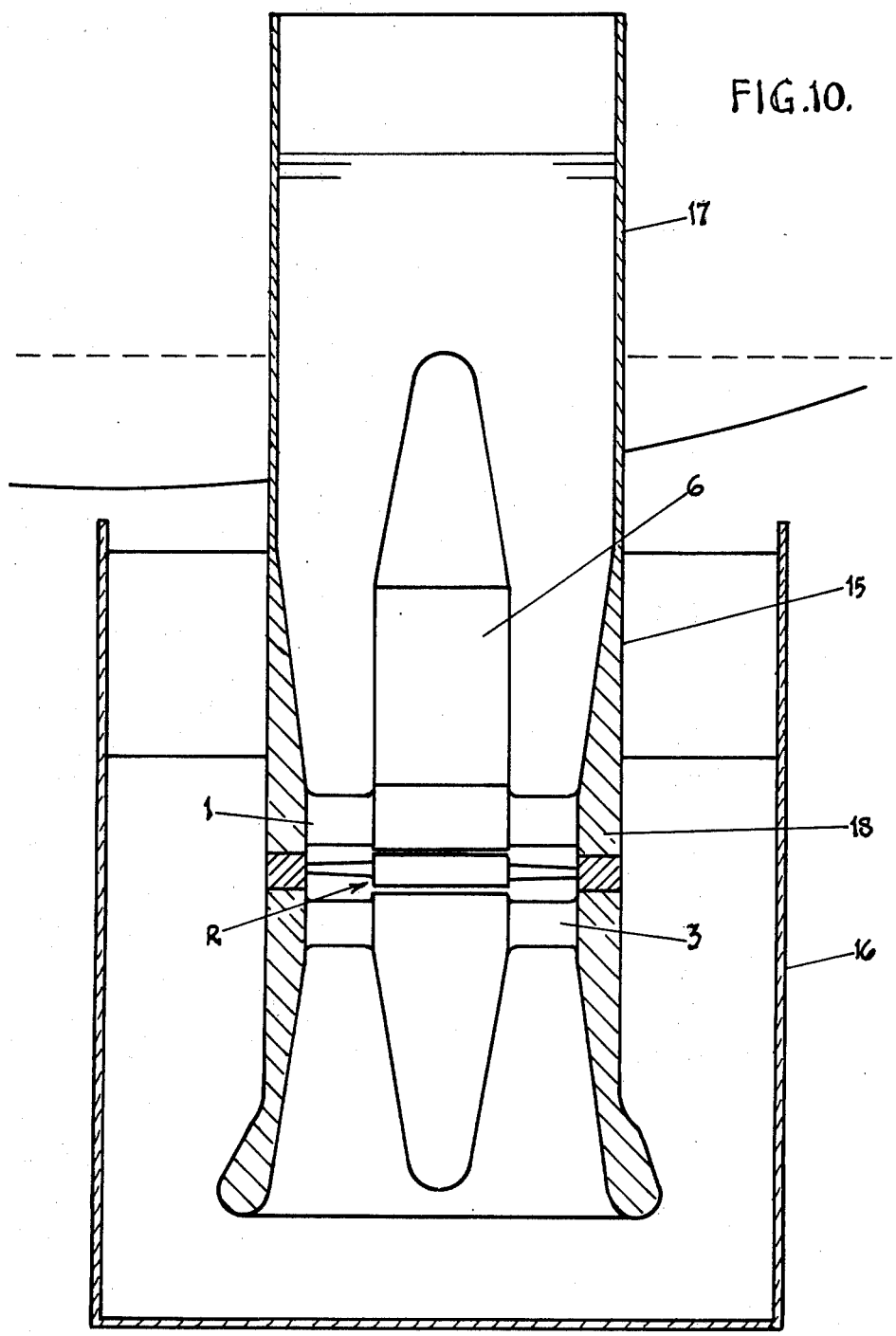

The arrangement illustrated in FIG. 10 makes use of an amplifier for transmitting the energy of a large mass of slowly moving water to a smaller but more rapidly moving mass. The turbine of this arrangement has its rotor R located between two sets of stator blades 1,3 in a vertical duct 15 having its lower end located within an outer casing 16. The outer casing 16 is supported with its upper end, which is open, just below the level of the wave troughs, so that it is exposed to pressure variations of the waves at a depth where pressure fluctuations are greatest. The upper end 17 of the duct 15 projects upwards from the water and acts as a surge tank, having a cross sectional area such that level fluctuations are a maximum for the average wave time period. The bore of the part 18 of the duct which accommodates the turbine rotor R is as small as is practicable without introducing excessive flow losses so that the greatest fluid velocity occurs at the rotor R, thus making the rotor speed as high as possible, the rotor being connected to a generator as at 6. The whole structure can be supported from floating pontoons (not shown) so that tidal level variations are automatically allowed for.

Figure 11:
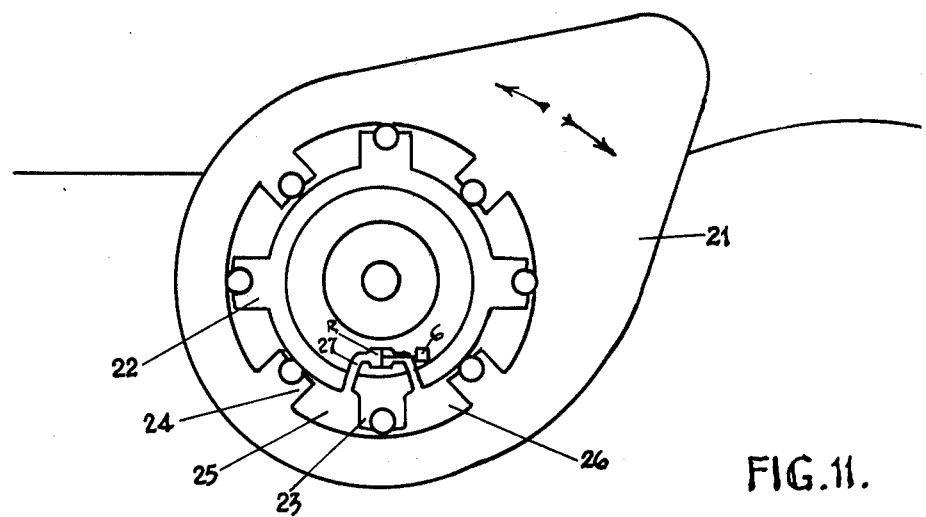

FIG. 11 shows a turbine in accordance with the invention within a Salter Duck device 21. The device incorporates an inertia ring 22, located coaxially within but of smaller diameter than a bore of the outer shell of the device, and carrying outwardly projecting vanes 23 which co-operate with vanes 24 projecting inwardly from the bore to provide a series of pressure chambers between them. Then as the nose of the outer shell moves in the upward direction and produces a rotation of the shell (in an anti-clockwise direction in the drawing), oil or other suitable hydraulic fluid will be forced from what are temporarily the "high" pressure chambers as at 25 into the "low" pressure chambers 26 through a duct 27 containing the turbine rotor R which is connected to a generator 6. When the nose of the outer shell falls the direction of flow of the working fluid is reversed, but rotation of the turbine is in the same direction as previously described. The duct conveniently incorporates two sets of stator blades (not shown) for reducing swirl as previously described. In practice it may be found convenient for all the chambers which act as high pressure chambers in one direction of rotation of the device to be ganged together, and for the other chambers, which act as the low pressure chambers in that direction of rotation of the device, also to be ganged together, by suitable manifolds, and a single turbine rotor can then be arranged in a duct connecting the two sets of ganged chambers.

Figure 12:
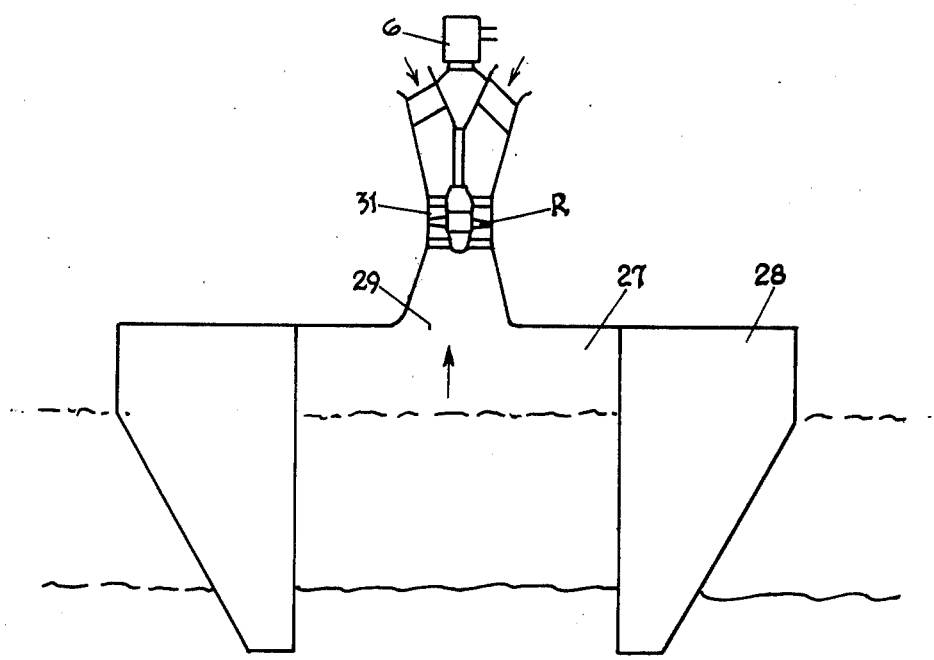

A further embodiment of the invention is illustrated in FIG. 12. In this embodiment the central chamber 27 of a Masuda buoy 28 communicates through a central opening 29 in its closed upper end to the lower end of a nominally vertical duct 31 accommodating a turbine rotor R mounted on the lower end of a shaft S which is coupled at its upper end to a generator 6. As the water level within the cavity 27 varies due to wave motion air will be caused to flow in opposite directions through the duct and produce a unidirectional rotation of the turbine rotor R.

Figure 13:
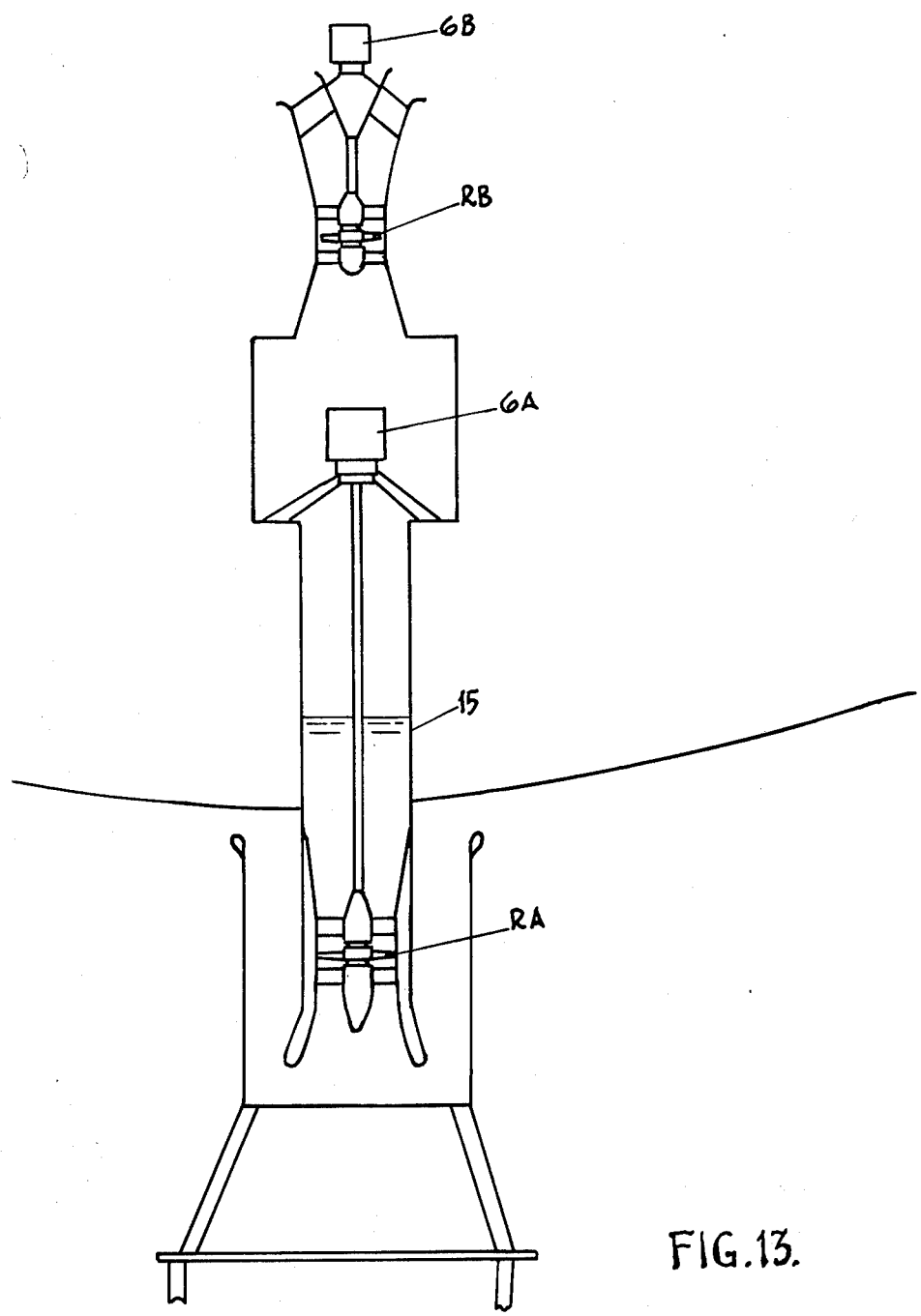

A further application of the invention is shown in FIG. 13. In this arrangement a vertical duct 15 has its lower end located within an outer casing in a similar manner to the arrangement illustrated in FIG. 10, and similarly accommodates a turbine rotor RA which is driven by rising and falling water levels within the duct and is coupled to a generator 6A. In this embodiment, however, the duct 15 is continued upwards and accommodates a further turbine rotor RB coupled to another generator 6B which is driven by air forced from and returning into the duct due to cyclic variations in the water level in the lower part of the duct.

Figure 14:
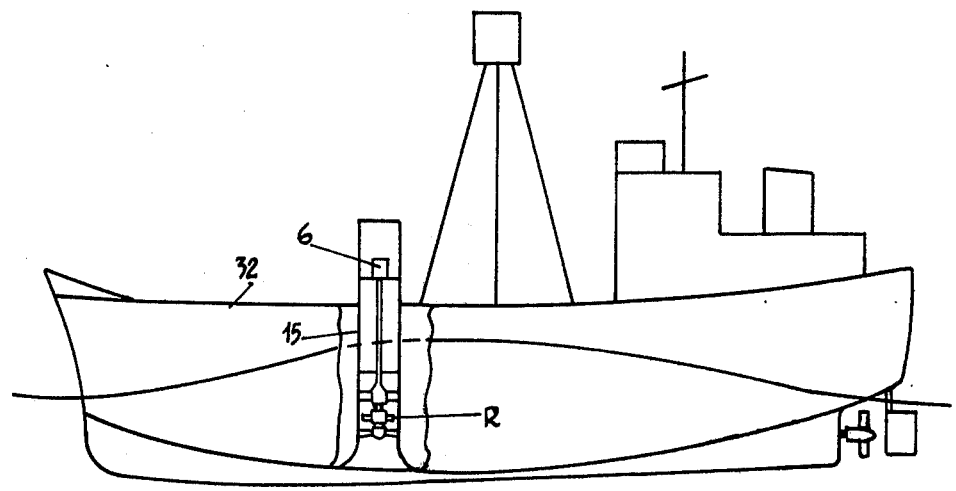

FIG. 14 shows a turbine rotor R mounted within a nominally vertical duct 15 in an appropriate position in a vessel 32, for example a light ship, and having its lower end opening to the sea, wave motion producing cyclic variations in the level of water within the duct, thereby driving the turbine rotor R which is connected to a generator 6, for providing at least some of the electrical power supplies for the vessel.

Alternatively, or additionally, an air operated turbine rotor may be located within a duct connected to the top of a surge tank located within the vessel. The principle may also be applied to small craft such as lifeboats as well as to large ocean going vessels.

Although the turbine rotors of the embodiments so far described are coupled to electrical generators it will be understood that they may alternatively be used to drive rotary pumps or other forms of energy converters.

Figure 15:
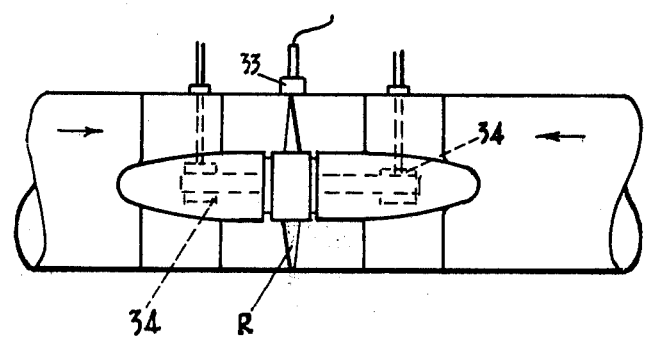

In addition the rotor of a turbine in accordance with the invention may be arranged to operate as a flow meter. One such arrangement is illustrated in FIG. 15, the rotor R being mounted for rotation in a horizontal duct, and being associated with a proximity detector 33 mounted on the wall of the duct adjacent the rotor and arranged to generate an output signal on the passage of a rotor blade. The arrangement can then incorporate means responsive to the output of the detector for indicating or recording the number of revolutions of the rotor. Such an arrangement is suitable in cases where the flow in both directions is required to be monitored. The rotor may be arranged to run in hydrostatic bearings 34 to reduce frictional losses.

Figure 16:
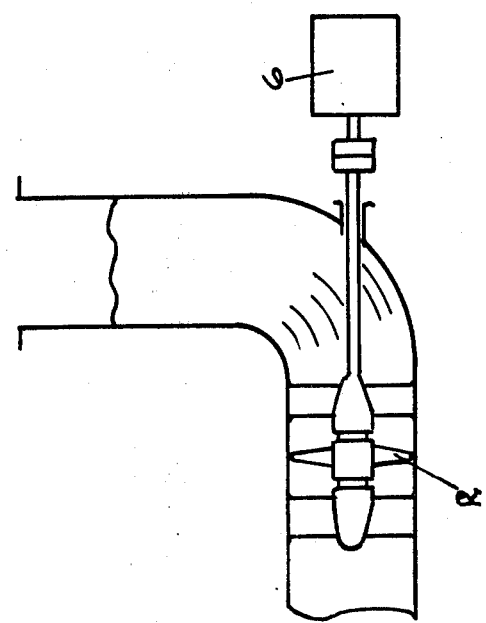
Figure 16:
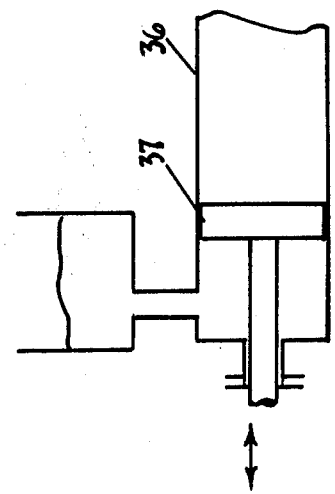

In addition power may be transported along a duct 36 by means, such as a reciprocating piston 37 acting as a pump, for producing a reciprocating flow of liquid along the duct to drive a turbine rotor R located at a distant position as shown in FIG. 16. The rotor will be driven in the same direction on both strokes of the piston 37, no return duct being required. The rotor may be coupled to a generator as at 6 or a pump or other energy converting device.

Figure 17:
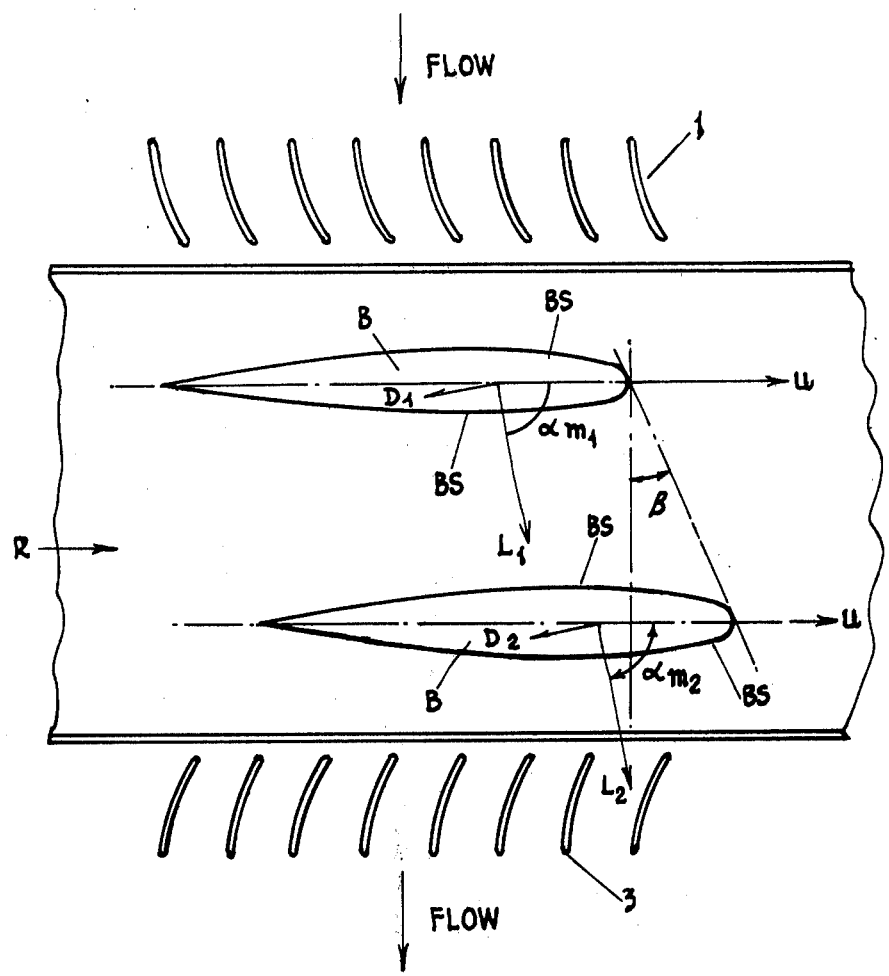

In a modification as illustrated diagrammatically in FIG. 17 the rotor shaft carries two similar rows of rotor blades spaced axially from each other. The blades of each row are staggered with respect to each other and the two rows of rotor blades are disposed between two sets of stator blades similar to those shown in FIG. 2; the stagger angle β being of any advantageous value.

The advantage of multiple rotor rows is that a much larger angular deflection E of the flow may be obtained, each row contributing a relatively small amount to the total fluid deflection due to the rotor. By this means the stage rotor torque and power output may be increased compared with a single row of blades, without the necessity for intermediate rows of stator blades.

More than two rows of rotor blades may be employed if desired.

Whilst in many cases it will be advantageous to stagger adjacent rows of rotor blades, the stagger angle β may be zero for some applications of the invention.

The precise form of the rotor blades, including the shape of the aerofoil surfaces, of a turbine in accordance with the invention may readily be selected to give the maximum efficiency for any particular application of the invention.

Similarly the spacing between adjacent rows of rotor blades can readily by chosen to suit the particular application of the invention. Whilst for most purposes it will be found convenient for the blades of different rows to have the same cross section, it may in some cases be advantageous to utilise blades with differently shaped aerofoil surfaces or different dimensions.

I claim:

1. A water turbine comprising a rotor for mounting below the surface of an expanse of water, and incorporating a plurality of generally radially extending rotor blades fixed in position relative to the rotor wherein each rotor blade is substantially symmetrical about a plane perpendicular to the rotor axis, and wherein the blades have surfaces which are of generally aerofoil shape and are mounted with their leading edges facing in the same circumferential direction, such that a flow of water past the blades generally parallel to the rotor axis produces a movement of the blades in a direction parallel to said plane of symmetry, and hence a rotation of the rotor in said circumferential direction.

2. A turbine according to claim 1 wherein the turbine rotor is mounted with its axis of rotation substantially vertical below the surface of an expanse of water subject to wave motion, such that the motion of the waves produces a cyclic flow of water past the rotor blades in a generally vertical direction to produce a unidirectional rotation of the rotor.

3. A turbine according to claim 2 mounted on a support structure arranged to be fixed to the bed of the expanse of water, with the turbine rotor at such a depth beneath the surface that wave motion of the water produces said cyclic flow of water past the rotor blades.

4. A turbine according to claim 2 mounted below a floatable body at a distance such that, when the body is floating on said expanse of water, vertical oscillations of the body as a result of wave motion produces said cyclic flow of water past the rotor blades.

5. A turbine according to claim 2 associated with a duct arranged to be supported with its axis substantially vertical and its lower end below the surface of the expanse of water wherein the turbine rotor is located within the duct so as to lie below the surface of the water when the duct is so supported.

6. A turbine according to claim 1 wherein the turbine rotor is mounted coaxially within a duct, and the duct incorporates stator blades axially spaced from the rotor blades in both directions, the stator blades being so inclined as to decrease or eliminate the swirl in the flow of water leaving the rotor.

7. A turbine according to claim 1 in association with an amplifier for converting the energy in a relatively large slowly moving mass of water to a smaller, more rapidly moving mass, the turbine rotor being located so as to be acted upon by the more rapid water flow.

8. A turbine according to claim 7 incorporating a duct located in a sea wall, with the main part of the duct substantially vertical and its lower end communicating with the open sea at a level below the wave troughs, and the turbine rotor being located within the main part of the duct, also below the level of the wave troughs, so that wave motion produces a cyclic variation in the level of the water in the duct which drives the turbine.

9. A turbine according to claim 1 in association with a floatable body having an outer shell incorporating a bore which extends generally horizontally when the body is floating on the surface of an expanse of water and is shaped so that wave motion produces a cyclic rotary movement of the shell about the axis of the bore, and the body incorporating an inertia ring located coaxially within, but of smaller diameter than, the bore, the inertia ring carrying a plurality of vanes which project outwards to the bore of the shell, and the latter carrying further vanes interposed between the projections of the inertia ring and projecting inwards to the surface of the ring to provide two sets of alternately disposed pressure chambers between the vanes containing water so that rotational movement of the shell in opposite directions with respect to the inertia ring, results in a cyclic increase or decrease in the pressure in one set of chambers, and a corresponding decrease or increase in the pressure in the other set of chambers, the chambers of the two sets being connected by a duct through which a cyclic flow of said water is produced due to the pressure variations, and the turbine rotor being located within the said duct.

10. A turbine according to claim 1 having an electric generator coupled to the turbine rotor so as to be driven thereby.

11. A turbine according to claim 1 having its rotor located within a duct, and associated with a proximity detector mounted on the wall of the duct adjacent the rotor and arranged to generate an output signal on the passage of a rotor blade, and means responsive to the output of the detector for indicating or recording the number of revolutions of the rotor.

12. A turbine according to claim 1 having its rotor located within a duct which is arranged to contain a water, means within the duct at a position remote from the turbine rotor for producing a reciprocating flow of water past the rotor to cause the rotation thereof, and a generator, pump or other rotary energy converting device coupled to the rotor so as to be driven thereby.

13. A turbine according to claim 1 wherein the rotor has a plurality of rows of blades spaced axially from each other, and mounted on a common rotor shaft.

14. A turbine according to claim 13 wherein the blades of adjacent rows are staggered with respect to each other.

15. A turbine according to claim 13 incorporating a duct having two axially spaced sets of stator blades, the plurality of rows of rotor blades are located between the two sets of stator blades and the stator blades are inclined so as to decrease or eliminate the swirl in the flow of water leaving the rotor.

* * * * *